(12) United States Patent
Berry et al.

(10) Patent No.: US 11,092,443 B2
(45) Date of Patent: Aug. 17, 2021

(54) METHOD, APPARATUS, AND SYSTEM FOR CATEGORIZING A STAY POINT BASED ON PROBE DATA

(71) Applicant: HERE GLOBAL B.V., Eindhoven (NL)

(72) Inventors: Tessa Berry, Naperville, IL (US); Onur Derin, Eindhoven (NL); Matei Stroila, Chicago, IL (US); Aniket Mitra, The Hague (NL)

(73) Assignee: HERE Global B.V., Eindhoven (NL)

( * ) Notice: Subject to any disclaimer, the term of this patent is extended or adjusted under 35 U.S.C. 154(b) by 218 days.

(21) Appl. No.: 16/196,874

(22) Filed: Nov. 20, 2018

(65) Prior Publication Data

US 2020/0158515 A1 May 21, 2020

(51) Int. Cl.
*G01C 21/32* (2006.01)
*H04W 4/02* (2018.01)
*G06F 16/29* (2019.01)

(52) U.S. Cl.
CPC ............. *G01C 21/32* (2013.01); *G06F 16/29* (2019.01); *H04W 4/027* (2013.01)

(58) Field of Classification Search
CPC ......... G01C 21/32; G06F 16/29; H04W 4/027
See application file for complete search history.

(56) References Cited

U.S. PATENT DOCUMENTS

| 6,192,312 B1 * | 2/2001 | Hummelsheim | G01C 21/30 340/988 |
| 6,502,033 B1 * | 12/2002 | Phuyal | G01C 21/30 340/988 |
| 7,463,974 B2 | 12/2008 | Morita et al. | |
| 2007/0198184 A1 * | 8/2007 | Yoshioka | G09B 29/106 701/426 |

(Continued)

FOREIGN PATENT DOCUMENTS

WO 2012073328 A1 6/2012

OTHER PUBLICATIONS

Zhang et al., abstract of "Road-segmentation-based Curb Detection Method for Self-driving via a 3d-lidar Sensor", Published in: IEEE Transactions on Intelligent Transportation Systems, Feb. 2018, 4 pages.

*Primary Examiner* — Calvin Cheung
(74) *Attorney, Agent, or Firm* — Ditthavong, Steiner & Mlotkowski

(57) ABSTRACT

An approach is provided for detecting stay points from probe data. The approach, for example, involves segmenting a probe trajectory into a first trajectory segment type (e.g., on-road), a second trajectory segment type (e.g., off-road), an unknown trajectory segment type, or a combination thereof. The approach also involves merging the unknown trajectory segment into either the first trajectory segment type or the second trajectory segment type based on a co-occurrence with the unknown trajectory segment. The approach further involves segmenting the first trajectory (Continued)

segment type into first sub-segments and the second trajectory segment type second sub-segments based on a minimum enclosing ball or any other bounding volume with a radius less than or equal to the distance threshold. The approach further involves processing each first sub-segment and each second sub-segment to determine stay points.

18 Claims, 15 Drawing Sheets

(56) References Cited

U.S. PATENT DOCUMENTS

| | | | | |
|---|---|---|---|---|
| 2011/0208425 A1* | 8/2011 | Zheng | ............... | G01S 19/14 |
| | | | | 701/532 |
| 2013/0091472 A1* | 4/2013 | Terai | ............... | G06F 3/0487 |
| | | | | 715/856 |
| 2013/0253817 A1* | 9/2013 | Blom | ............... | H04W 4/029 |
| | | | | 701/400 |
| 2014/0164390 A1* | 6/2014 | Hampapur | ............... | G06F 16/29 |
| | | | | 707/743 |
| 2015/0026142 A1* | 1/2015 | Wang | ............... | G01C 21/20 |
| | | | | 707/693 |
| 2015/0279213 A1 | 10/2015 | Balter et al. | | |
| 2015/0339371 A1* | 11/2015 | Cao | ............... | G06Q 30/0205 |
| | | | | 707/737 |
| 2017/0322035 A1 | 11/2017 | Dorum | | |
| 2018/0364063 A1* | 12/2018 | Dorum | ............... | G01C 21/3685 |
| 2020/0107163 A1* | 4/2020 | Li | ............... | G01S 5/08 |

\* cited by examiner

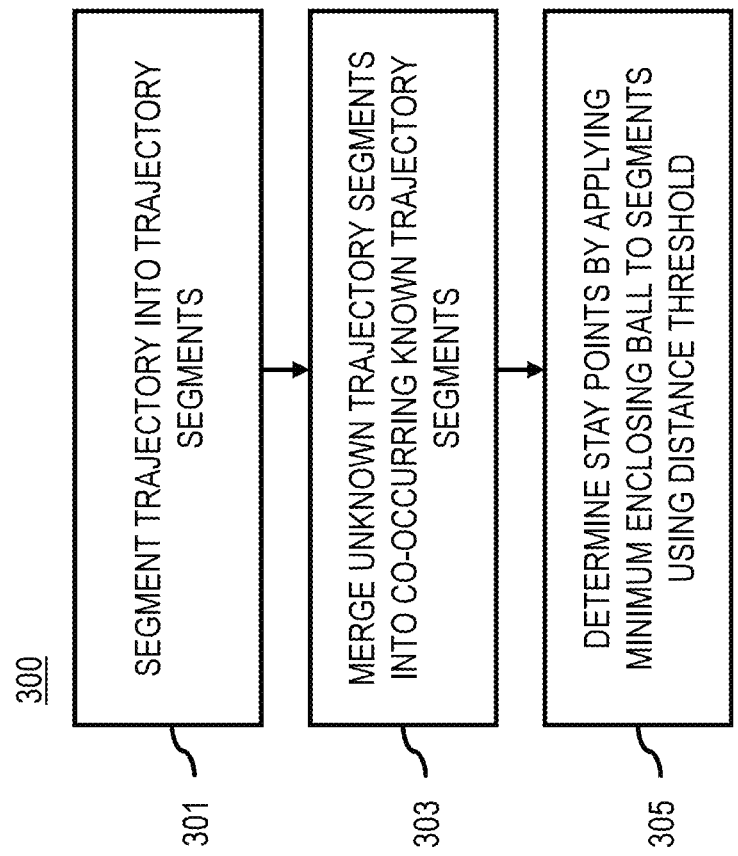

METHOD, APPARATUS, AND SYSTEM FOR CATEGORIZING A STAY POINT BASED ON PROBE DATA

BACKGROUND

Stay points are locations where people have stayed for a while and are of particular interest to map service providers. Stay points can often indicate locations of points of interest (POIs), potential traffic incidents, events, and/or any other type of map-related feature. However, automatically distinguishing between these different types of stay points presents significant technical challenges. Conventionally, when a stay point is detected, map service providers may have to deploy personnel to manually confirm the stay point and classify it, receive crowd source reports on the type, etc. These conventional means can be resource intensive and generally do not scale well with increasing numbers of stay points.

SOME EXAMPLE EMBODIMENTS

Therefore, there is a need for an approach for detecting stay points and then automatically identifying or categorizing the type of detected stay point. For example, the embodiments of the approach described herein can be used to distinguish between on-road stay points which can denote people who are stuck in traffic congestion or waiting at traffic signal versus off-road stay points which can denote people refueling at a gas station or spending time at a shopping mall or other off-road location.

According to one embodiment, a computer-implemented method for detecting stay points from probe data comprises segmenting a probe trajectory into a first trajectory segment of a first type (e.g., an on-road trajectory segment), a second trajectory segment of a second type (e.g., an off-road trajectory segment), an unknown trajectory segment of an unknown type, or a combination thereof. The method also comprises merging the unknown trajectory segment into either the first trajectory segment or the second trajectory segment based on a co-occurrence of the unknown trajectory segment with either the first trajectory segment or the second trajectory segment. The method further comprises segmenting the first trajectory segment into a plurality of first sub-segments or the second trajectory segment into a plurality of second sub-segments based on a minimum enclosing ball or any other bounding volume with a radius less than or equal to the distance threshold. The method further comprises processing each of the first sub-segments and each of the second sub-segments to determine respectively a first stay point of the first type (e.g., an on-road stay point) or a second road stay point of the second type (e.g., an off-road stay point).

According to another embodiment, an apparatus for detecting stay points from probe data comprises at least one processor, and at least one memory including computer program code for one or more computer programs, the at least one memory and the computer program code configured to, with the at least one processor, cause, at least in part, the apparatus to segment a probe trajectory into a first trajectory segment of a first type (e.g., an on-road trajectory segment), a second trajectory segment of a second type (e.g., an off-road trajectory segment), an unknown trajectory segment of an unknown type, or a combination thereof. The apparatus is also caused to merge the unknown trajectory segment into either the first trajectory segment or the second trajectory segment based on a co-occurrence of the unknown trajectory segment with either the first trajectory segment or the second trajectory segment. The apparatus is further caused to segment the first trajectory segment into a plurality of first sub-segments or the second trajectory segment into a plurality of second sub-segments based on a minimum enclosing ball or any other bounding volume with a radius less than or equal to the distance threshold. The apparatus is further caused to process each of the first sub-segments and each of the second sub-segments to determine respectively a first stay point of the first type (e.g., an on-road stay point) or a second road stay point of the second type (e.g., an off-road stay point).

According to another embodiment, a non-transitory computer-readable storage medium for detecting stay points from probe data carries one or more sequences of one or more instructions which, when executed by one or more processors, cause, at least in part, an apparatus to segment a probe trajectory into a first trajectory segment of a first type (e.g., an on-road trajectory segment), a second trajectory segment of a second type (e.g., an off-road trajectory segment), an unknown trajectory segment of an unknown type, or a combination thereof. The apparatus is also caused to merge the unknown trajectory segment into either the first trajectory segment or the second trajectory segment based on a co-occurrence of the unknown trajectory segment with either the first trajectory segment or the second trajectory segment. The apparatus is further caused to segment the first trajectory segment into a plurality of first sub-segments or the second trajectory segment into a plurality of second sub-segments based on a minimum enclosing ball or any other bounding volume with a radius less than or equal to the distance threshold. The apparatus is further caused to process each of the first sub-segments and each of the second sub-segments to determine respectively a first stay point of the first type (e.g., an on-road stay point) or a second road stay point of the second type (e.g., an off-road stay point).

According to another embodiment, an apparatus for detecting stay points from probe data comprises means for segmenting a probe trajectory into a first trajectory segment of a first type (e.g., an on-road trajectory segment), a second trajectory segment of a second type (e.g., an off-road trajectory segment), an unknown trajectory segment of an unknown type, or a combination thereof. The apparatus also comprises means for merging the unknown trajectory segment into either the first trajectory segment or the second trajectory segment based on a co-occurrence of the unknown trajectory segment with either the first trajectory segment or the second trajectory segment. The apparatus further comprises means for segmenting the first trajectory segment into a plurality of first sub-segments or the second trajectory segment into a plurality of second sub-segments based on a minimum enclosing ball or any other bounding volume with a radius less than or equal to the distance threshold. The apparatus further comprises means for processing each of the first sub-segments and each of the second sub-segments to determine respectively a first stay point of the first type (e.g., an on-road stay point) or a second road stay point of the second type (e.g., an off-road stay point).

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 3 is a flowchart of a process for identifying stay points from probe data, according to one embodiment;

DESCRIPTION OF SOME EMBODIMENTS

Examples of a method, apparatus, and computer program for identifying stay points from probe data are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
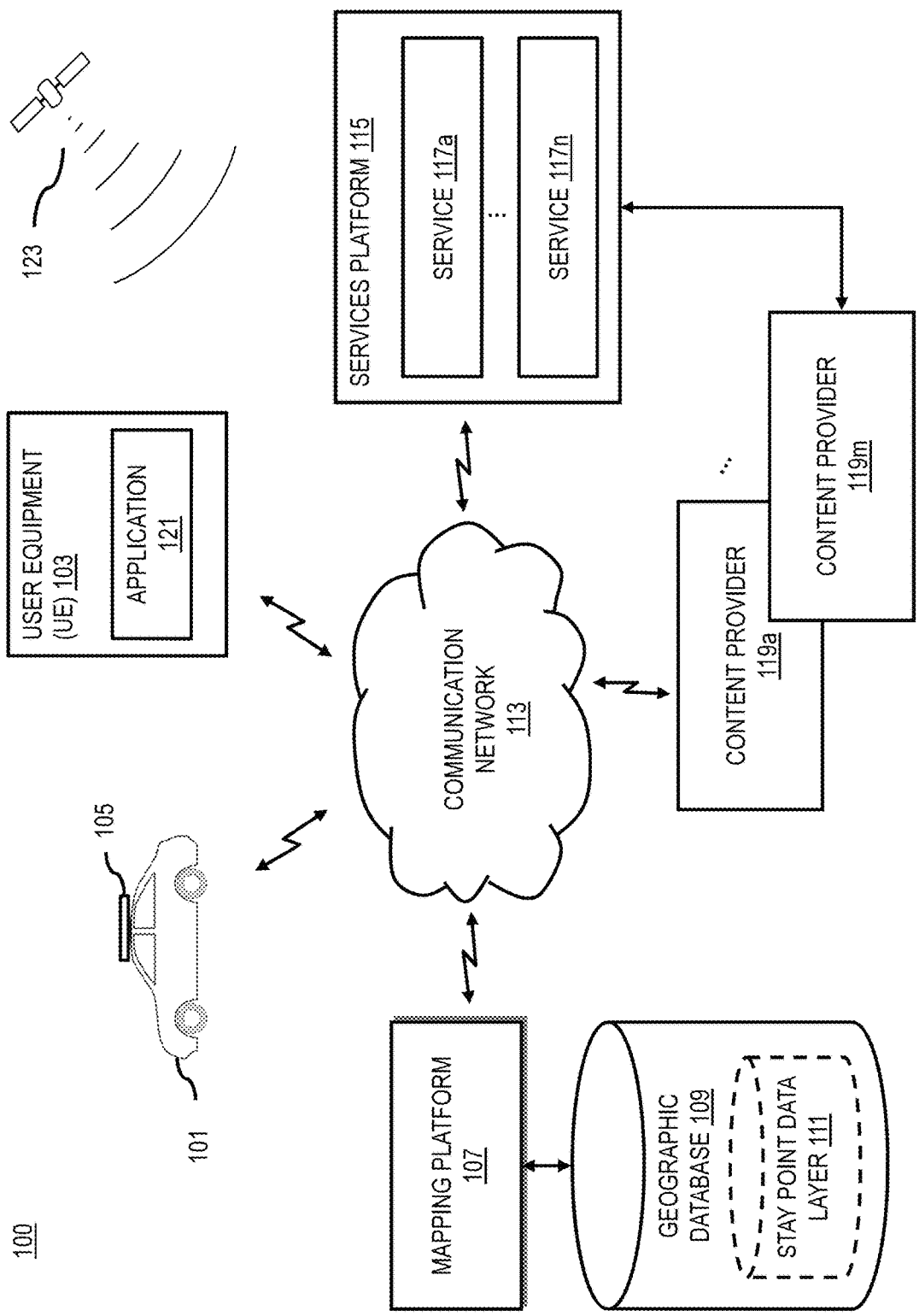
FIG. 1 is a diagram of a system capable of identifying stay points from probe data, according to one embodiment.

FIG. 1 is a diagram of a system capable of identifying stay points from probe data, according to one embodiment. In one embodiment, stay points can be defined as a sequence of time-stamped spatial points (e.g., a trajectory segment) that fall within a distance threshold. For example, a probe (e.g., a vehicle 101 and/or user equipment (UE) 103 such as smartphone or other mobile device) can be configured to collect location samples (e.g., probe points comprising the probe's location <latitude, longitude, elevation> and heading) using onboard sensors 105 at a designated frequency. This time-ordered sequence of probe points makes up the probe's trajectory. If any segment of the trajectory is detected to remain within a distance threshold of each other, the system 100 can designate the corresponding location (e.g., a centroid of the locations of the probe points) as a stay point.

However, a probe trajectory segment satisfying the distance threshold can be caused by any number of reasons. For example, the detected stay point can be due to a probe (e.g., vehicle 101) being stuck in traffic congestion, waiting at a traffic signal, etc. This type of stay point can be referred to as an on-road stay point because they occur on a road segment. In contrast, a trajectory segment satisfying the distance threshold can also be due a probe staying for a while at a gas station, shopping mall, etc. that occurs off of a road segment, which can be referred to as off-road stay points. However, as discussed above, classifying what type of stay point was detected (e.g., on-road versus off-road stay point) traditionally required reports from human observers sent to or otherwise located at the stay point. Therefore, map service providers (e.g., operators of a mapping platform 107) face significant technical challenges to automatically detecting the type of stay point without requiring human observation and the resource burden associated with conventional manual processes.

To address these technical challenges, the system 100 of FIG. 1 introduces a capability to distinguish between different types of stay points (e.g., on-road stay points versus off-road stay points) by segmenting individual probe trajectories by type and then applying a distance threshold using computational geometry (e.g., a computed minimum enclosing ball (MEB) or any other equivalent bounding volume) to identify stay points from the resulting trajectory segments according to the classified type of the corresponding segment. In this way, the system 100 can automatically classify detected stay points according to the type assigned to the trajectory segments from which the stay point was determined, thereby advantageously avoiding the need for human classification of stay points and reducing the resources needed make those human or other conventional classifications. In one embodiment, the identified stay points can then be stored in a stay point data layer 111 of the geographic database 109 or equivalent data store for publishing or access over a communication network 113 by end users (e.g., vehicle 101, UE 103, services platform 115, any of the services 117a-117n of the services platform 115, etc.).

In one embodiment, probe trajectory segmentation is performed using map matching confidence to classify the types of the resulting trajectory segments. By way of example, the map matching confidence can be determined by processing the trajectory using any map matching system (e.g., path-based map matchers, point-based map matchers, etc.). For example, trajectory segments with high map matching confidence (e.g., above a threshold value) can be classified as being on a road because they are likely to have been correctly map matched to one or more road segments of a digital map (e.g., a geographic database 109). Conversely, trajectory segments with low map matching confidence (e.g., below a threshold value) can be classified as being off a road because they are not likely to match any road segment of the digital map. As discussed above, the stay points determined from each type of trajectory segment can then inherit the segment type. For example, stay points determined from on-road trajectory segments will be classified as on-road stay points, and stay points determined from off-road trajectory segments will be classified as off-road stay points.

In some embodiment, map matching or segmentation may not be able to classify trajectory segments into known types with a target level of confidence. Accordingly, some trajectory segments may be classified as unknown types. In one embodiment, the system 100 can optionally merge these unknown types into one of the known types (e.g., on-road or off-road) based on their co-occurrence with known trajectory segment types. For example, if an unknown trajectory segment occurs immediately before, after, or between an on-road trajectory segment, the unknown trajectory can be merged with the co-occurring on-road trajectory. This can be done similarly for co-occurrence with off-road trajectory segments or trajectory segments of any known type. In this way, the system 100 can merge unknown trajectory segments into known segments before determining stay points to provide for increase coverage of the original probe trajectory.

Although some of the various embodiments described herein are discussed with respect to differentiating between on-road and off-road segments, it is contemplated that the various embodiments are applicable to differentiating stay points of any type. In other words, the embodiments described herein can generalize to creation of specific type of stay points along any selected type of road or trajectory segment. For example, the system 100 could segment probe trajectories according to specialized parking links, specialized functional class, etc. and then respectively create specialized parking link stay points, specialized functional class stay points, etc.

Figure 2:
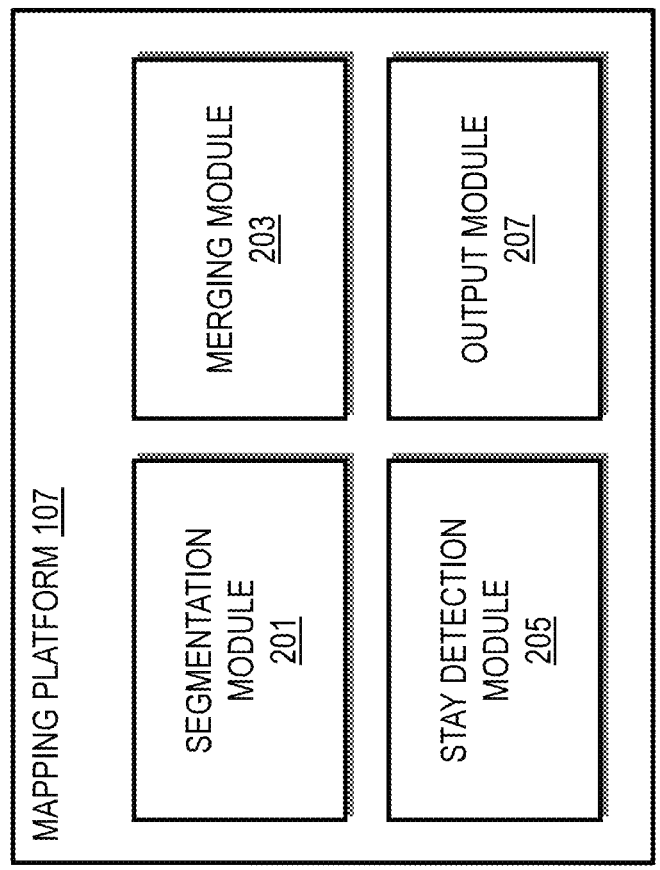
FIG. 2 is a diagram of components of a mapping platform capable of identifying stay points from probe data, according to one embodiment.

In one embodiment, as shown in FIG. 2, the mapping platform 107 includes one or more components for identifying stay points from probe data, according to the various embodiments described herein. It is contemplated that the functions of these components may be combined or performed by other components of equivalent functionality. In this embodiment, the mapping platform 107 includes a segmentation module 201, merging module 203, stay detection module 205, and output module 207. The above presented modules and components of the mapping platform 107 can be implemented in hardware, firmware, software, or a combination thereof. Although shown as a separate entity in FIG. 1, it is contemplated that the mapping platform 107 may be implemented as a module of any other component of the system 100 (e.g., a component of the services platform 115, services 117a-117n (also collectively referred to as services 117), vehicle 101, UE 103, etc.). In another embodiment, one or more of the modules 201-207 may be implemented as a cloud based service, local service, native application, or combination thereof. The functions of the mapping platform 107 and the modules 201-207 are discussed with respect to FIGS. 3-8 below.

Figure 11:
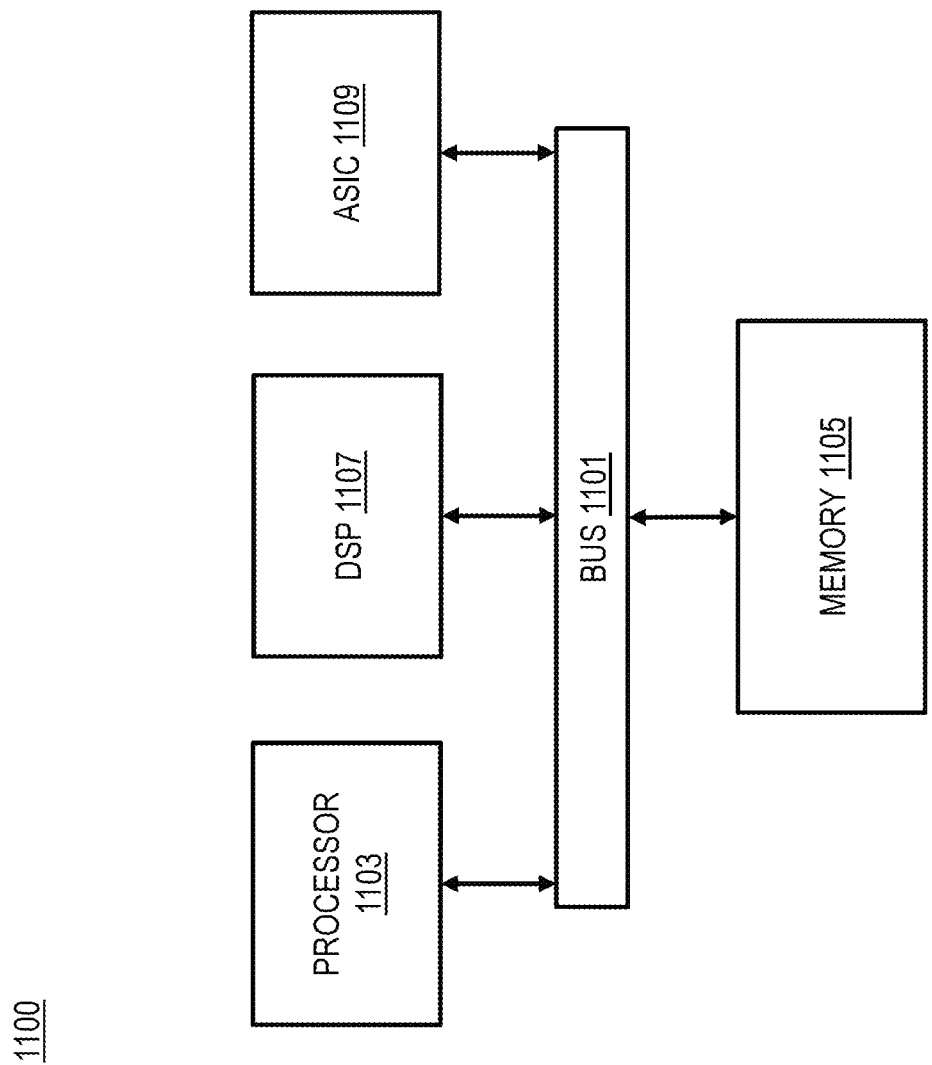
FIG. 11 is a diagram of a chip set that can be used to implement an embodiment.

FIG. 3 is a flowchart of a process for identifying stay points from probe data, according to one embodiment. In various embodiments, the mapping platform 107 and/or any of the modules 201-207 may perform one or more portions of the process 300 and may be implemented in, for instance, a chip set including a processor and a memory as shown in FIG. 11. As such, the mapping platform 107 and/or any of the modules 201-207 can provide means for accomplishing various parts of the process 300, as well as means for accomplishing embodiments of other processes described herein in conjunction with other components of the system 100. Although the process 300 is illustrated and described as a sequence of steps, its contemplated that various embodiments of the process 300 may be performed in any order or combination and need not include all of the illustrated steps.

In one embodiment, the process 300 can be used alone or as part of a digital map making process whereby probe data (e.g. trajectories and probe points) are collected from the sensors (e.g., location sensors such as GPS/GNSS sensors) of probe devices (e.g., vehicle 101, UE 103, etc.) operating in a road network. The process 300, for instance, is based on probe data techniques such as probe trajectory formation (e.g., sequencing time-stamped probe points collected from an individual probe to represent its path), map matching, and probe trajectory segmentation. In one embodiment, the process 300 also incorporates computational geometry techniques such as but not limited to construction of a minimum enclosing ball (MEB) around segments of the probe trajectory to create stay points.

Accordingly, in step 301, the segmentation module 201 segments a probe trajectory into a first trajectory segment of a first type, a second trajectory segment of a second type, an unknown trajectory segment of an unknown type, or a combination thereof. By way of example, a probe trajectory is a time-ordered sequence of probe data points (e.g., location and heading) associated with a single probe (e.g., identified by a probe identifier) that represents movement of the probe (e.g., vehicle 101, UE 103) over a geographic area (e.g., a road network). In one embodiment, the segmentation types (e.g., first type and second type mentioned above) are based on map matching confidences of the respective trajectory segments. For example, the first type can be trajectory segments with map matching confidences that are above a certain upper threshold value, the second type can be trajectory segments with map matching confidences that are below a certain lower threshold, and the unknown type can be those trajectory segments that are between the upper and lower thresholds or have undetermined map matching confidences. In other words, the segmentation of probe trajectories is performed using map matching to correlate individual probe points or segments of the probe trajectory to road segments or links of a digital map (e.g., the geographic database 109) using any type of map matcher (e.g., publicly available map matchers or map matchers that are proprietary to a map service provider). Map matchers typically include a numerical confidence of match value (i.e., map matching confidence) to represent the confidence that the map matchers have accurately matched a probe point or segment to a road segment or link of the digital map.

In one embodiment, trajectory segmentation results in partitioning of a probe trajectory into a (typically small) number of pieces, which are called trajectory segments. The segmentation module 201, for instance, can use the map matching confidence of the probe points of the probe trajectory to ground continuous sequences of probe points with the similar map matching confidence values together. In one embodiment, the segmentation module 201 can define an upper threshold value for the map matching confidence above which a probe point or segment would be classified as "Good" (e.g., indicating a good match to a road segment or link, and therefore is likely to be an on-road probe point or segment), and a lower threshold value for the map matching below which a probe or segment would be classified as "Bad" (e.g., indicating a bad match to any road segment or link, and there is likely to be an off-road probe point or segment). The upper threshold and the lower threshold can be different values with the upper threshold value being higher than the lower threshold value. In this case, probe points or segments with map matching confidences between the upper and lower thresholds or with map matching confidences not calculated or available from the map matcher can be classified as "Unknown". To generalize, in one embodiment, the segmenting of the probe trajectory is based on a map-matching confidence of the probe trajectory to a digital map storing map features of the first type (e.g., on-road type), the second type (e.g., off-road type), or an unknown type.

Figure 4A:
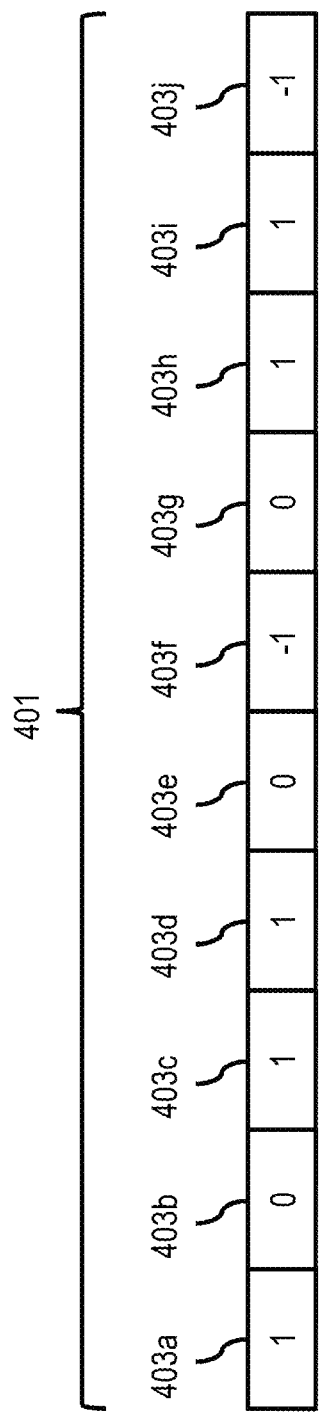
FIGS. 4A-4C are diagrams respectively illustrating segmenting of a probe trajectory, merging of unknown trajectory segments, and splitting segments to identify stay points, according to one embodiment.

FIG. 4A illustrates an example segmentation of a probe trajectory 401 into trajectory segments 403*a*-403*j* (also collectively referred to as trajectory segments 403) based on map matching confidence. In this example, the categories or segment types of "Good" (e.g., a first type), "Unknown", and "Bad" (e.g., a second type) map matching are respectively represented and labeled as "1", "0", and "−1". As discussed above, here, a label of "Good(1)" denotes a segment 403 whose points have been map-matched with a higher confidence (e.g., map matching confidence above an upper threshold value) and signifies an on-road segment, while a label of "Bad(−1)" denotes a segment whose points have been map-matched with a low confidence (e.g., map matching confidence below a lower threshold value) and signifies an off-road segment. Similarly, a label of "Unknown(0)" denotes a segments whose points have been map-matched with a confidence that lies between the lower and upper thresholds.

In one embodiment, the segmenting of the probe trajectory can be based on an attribute of a probe from which the probe trajectory was collected. Examples of the attribute include but are not limited to speed, a heading, or a combination thereof of the probe. For example, the segmentation module 201 can determine an average value or variance of the attribute (e.g., speed, heading) in one type of segment (e.g., on-road segment). The segmentation module 201 can then compare the speed and/or heading of the probe points or segments to the average/variance values to determine whether there is a potential misclassification based on map matching confidence alone. If the observed values of the probe points or segments differ from reference variance or value of the segment type by more than a threshold, then the segmentation module 201 determines that the points or segments have been misclassified and assigns a type whose attribute values more closely aligns with the observed attributes.

Figure 4B:
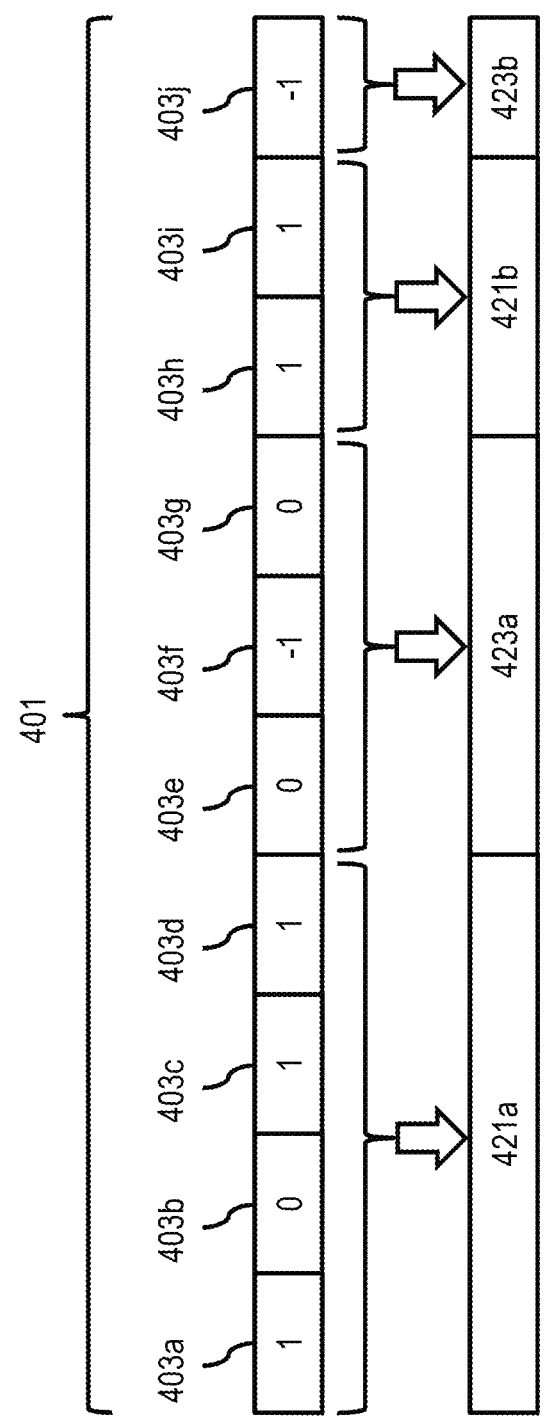

After segmentation and classification into types (e.g., Good/on-road, Bad/off-road, and Unknown), the segments can optionally be merged. For example, in step 303, the merging module 203 merges the unknown trajectory segment into either the first trajectory segment (e.g., with a first known type such as on-road or other road link attribute) or the second trajectory segment (e.g., with a second known type such as off-road or other road link attribute different than the first type) based on a co-occurrence of the unknown trajectory segment with either the first trajectory segment or the second trajectory segment. For instance, as shown in the example of FIG. 4B, the segmentation module 201 can use segments 403 of the probe trajectory 401 as labeled in the example of FIG. 4A (e.g., labeled as Good(1), Unknown(0), and Bad(−1)) to group segments. In one embodiment, this grouping or merging can be performed such that when Bad(1) and Unknown(0) segments co-occur (e.g., Bad(−1) segment 403*f* occurring between Unknown(0) segments 403*e* and 403*g*), they are merged into one segment and labeled as an off-road segment 423*a*. Similarly, when an Unknown(0) segment 403*b* occurs between a sequence of Good(1) segments 403*a*, 403*c*, and 403*d*, they are grouped into one segment and labeled as an on-road segment 421*a*. In addition, Good(1) segments 403*h* and 403*i* can be merged into on-road segment 421*b*, and Bad(−1) segment 403*j* can be merged into an off-road segment 423*b*. In other words, in one embodiment, the co-occurrence of a segment with respect to another segments refers to the segment preceding, following, or occurring in between the other segments.

After the segments are merged if needed or configured to, the stay detection module 205 can further sub-segment the trajectory segments based on a distance threshold and label each sub-segment as a stay point with a type that corresponds to the type of trajectory segment from which it was determined (step 305). For example, a detected stay point can be labeled as an on-road stay point if it belongs to an on-road trajectory segment or as an off-road stay point if it belongs to an off-road trajectory segment. In one embodiment, the stay detection module 205 segments a first trajectory segment into a plurality of first sub-segments of a first type (e.g., an on-road type), a second trajectory segment of second type (e.g., an off-road type), or a combination thereof into a plurality of second sub-segments based on a minimum enclosing ball (MEB) with a predefined radius less than or equal to a distance threshold. By way of example, an MEB defines a spherical volume of space, defined by a center and radius, that encloses the probe points of the sub-segment within a minimum radius up to a maximum distance threshold (e.g., a distance threshold set by the system 100 to define a maximum extent of a stay point). The MEB can be determined using any algorithm or process known in the art. Although the various embodiments are discussed with to an MEB, it is contemplated that any other equivalent computational geometry technique or bounding volume can also be used in the embodiments described herein. A bounding volume, for instance, can be defined using any geometric shape, parameter, etc. to enclose a set of probe points of a probe trajectory for segmentation. The stay detection module 205 then processes the first sub-segments or the second sub-segments to determine respectively a first stay point of the first type or a second road stay point of the second type. For example, if the sub-segment or corresponding MEB includes at least a designated minimum number of probe points within the sub-segment or MEB, then a stay point can be detected (e.g., meaning that the probe device has stayed within the sub-segment or MEB for period of time).

Figure 4C:
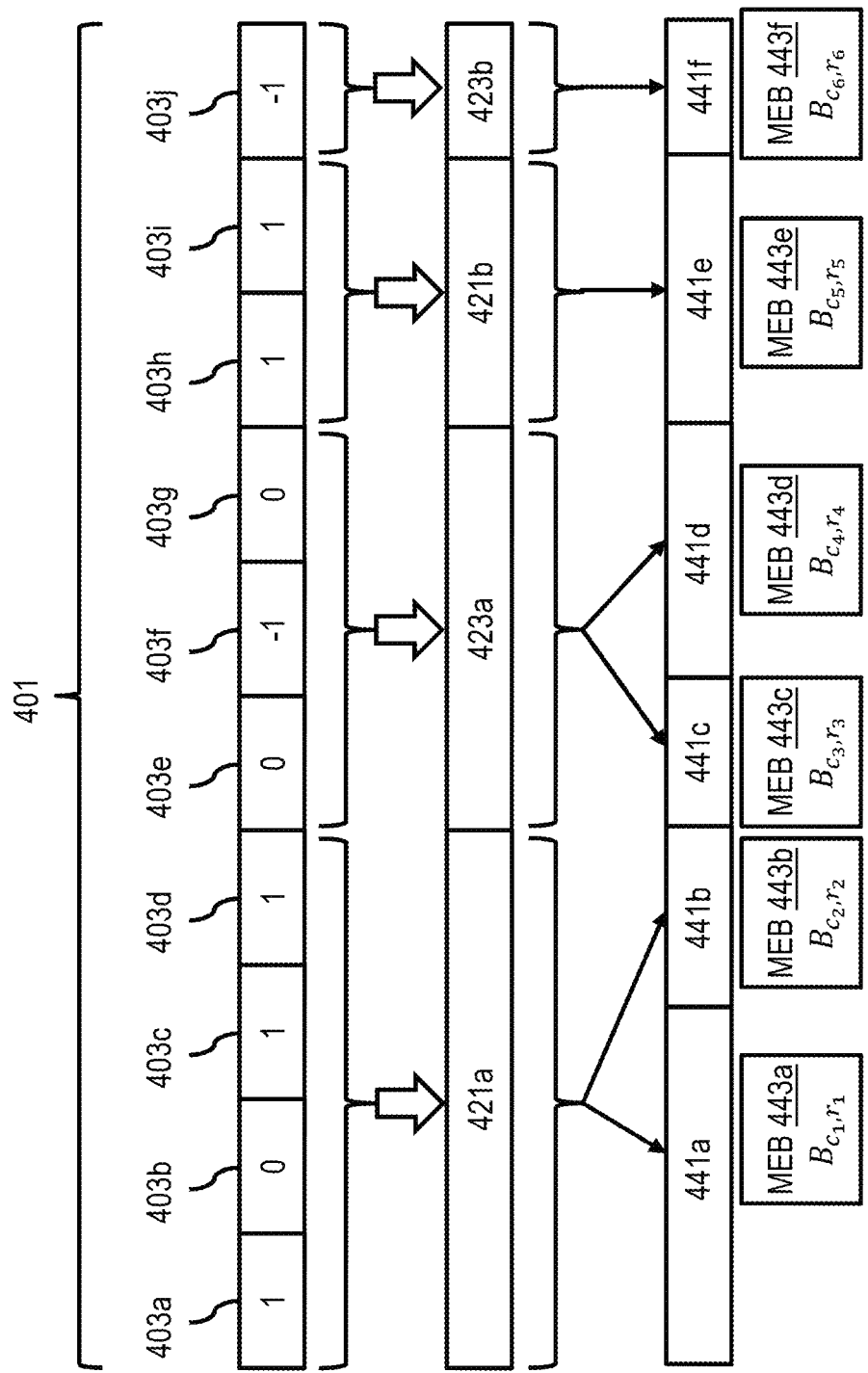

FIG. 4C illustrates an example of the sub-segmentation of the merged trajectory segments 421a, 423a, 421b, and 423b described in the example of FIG. 4B. As shown in FIG. 4C, the on-road trajectory segment 421a is further segmented to create an on-road sub-segment 441a based on an MEB 443a centered at a location $c_1$ with a radius $r_1$ that is less than a designated distance threshold, and an on-road sub-segment 441b based on a MEB 443b (e.g., centered at $c_2$ with radius $r_2$). Off-road trajectory segment 423a is further segmented into off-road sub-segment 441c based on MEB 443c (e.g., centered at $c_3$ with radius $r_3$) and off-road sub-segment 443d based on MEB 443d (e.g., centered at $c_4$ with radius $r_4$). On-road trajectory segment 421b is not further segmented so that the entire segment is used to create a sub-segment 441e based on MEB 443e (e.g., centered at $c_5$ with radius $r_5$). Similarly, off-road trajectory segment 423b is not further segmented so that the entire segment is used to create a sub-segment 441f based on MEB 443f (e.g., centered at $c_6$ with radius $r_6$).

In summary, in one embodiment, the process 300 includes: (1) segmenting a probe trajectory (e.g., associated with a single probe ID) using any segmenting means including but not limited to map-matching confidence values for matching a probe point/segment to any type of map feature (e.g., on-road versus off-road, parking links versus non-parking links, functional class, and/or any other map attribute or classification); (2) optionally merging any segments that have unknown segment types (e.g., unknown with respect to any attribute against which the probe points or segments are map matched); and (3) splitting the trajectory segments based on distance thresholds using computation geometry techniques such as but not limited to MEB to determine stay points.

Figure 5A:
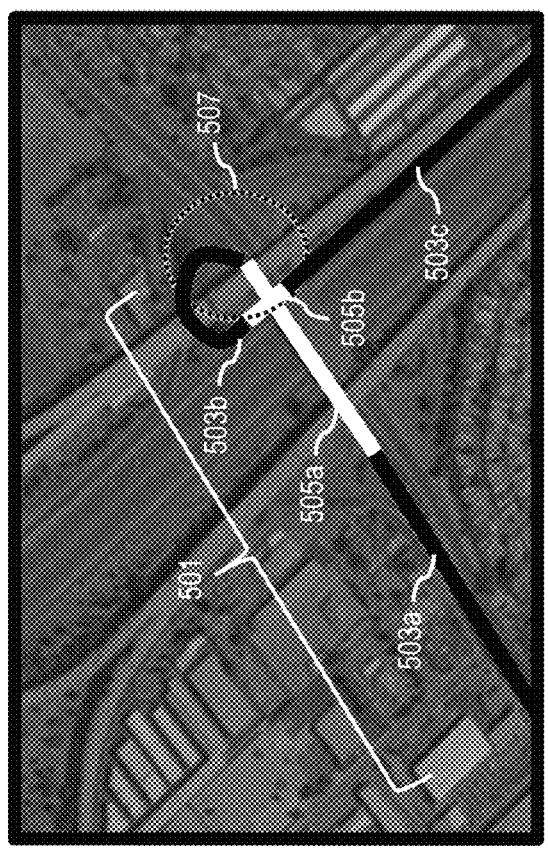
FIGS. 5A and 5B are diagrams illustrating an example use case for segmenting a trajectory by map-matched confidence and by map-matched confidence in combination with a minimum enclosing ball (MEB) diameter, according to one embodiment.
Figure 5B:
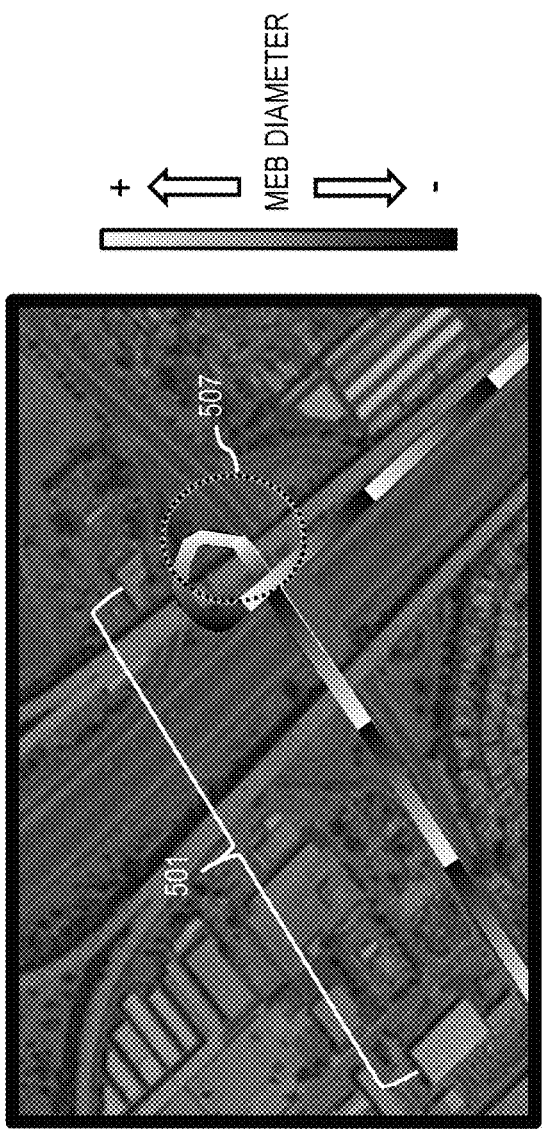

As can be seen in FIG. 5A, the mapping platform 107 (e.g., using embodiments of the process 300) takes as input a probe trajectory 501 that has been segmented by map-matching confidence. For example, black trajectory segments 503a-503c are Good(1) segments, white trajectory segments 505a and 505b are Unknown(0) segments, and gray trajectory segments are Bad(−1) segments (none shown in FIG. 5A). Then merging of the white (e.g., Unknown(0)) trajectory segments 505a and 505b is performed which is evident when comparing the encircled part 507 of each of FIGS. 5A and 5B. FIG. 5B is a different view of the trajectory 501 after further segmentation using an MEB. In this example, the sub-segments of the trajectory 501 are shaded to indicate the corresponding MEB diameter calculated along each sub-segment (with darker shades indicating smaller diameters while lighter shades indicate larger diameters up to a maximum of the distance threshold). In FIG. 5A, the encircled part 507 shows a white Unknown(0) trajectory segment 505a enclosed between two black Good(1) segments 503a and 503b. In FIG. 5B, the same encircled part 507 shows that the diameter of the MEB keeps increasing (e.g., becoming a lighter shade) even though it transitions from an Unknown(0) trajectory segment 505a to a Good(1) trajectory segment 503b as indicated in FIG. 5A. This is because, in the merging step, the mapping platform 107 has merged the black Good(1) segments 503a and 503b with the white Unknown(0) segment 505a before running the sub-segmentation and MEB process used to produce FIG. 5B.

Figure 6B:
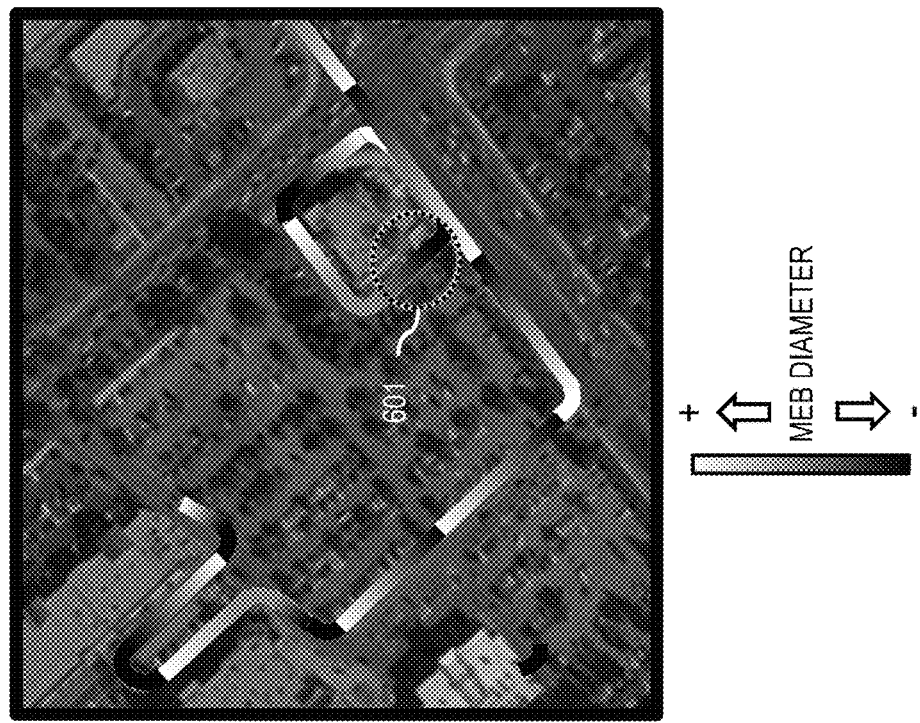
FIGS. 6A-6C are diagrams illustrating an example use case for distinguishing between on-road and off-road stay points, according to one embodiment.
Figure 6A:
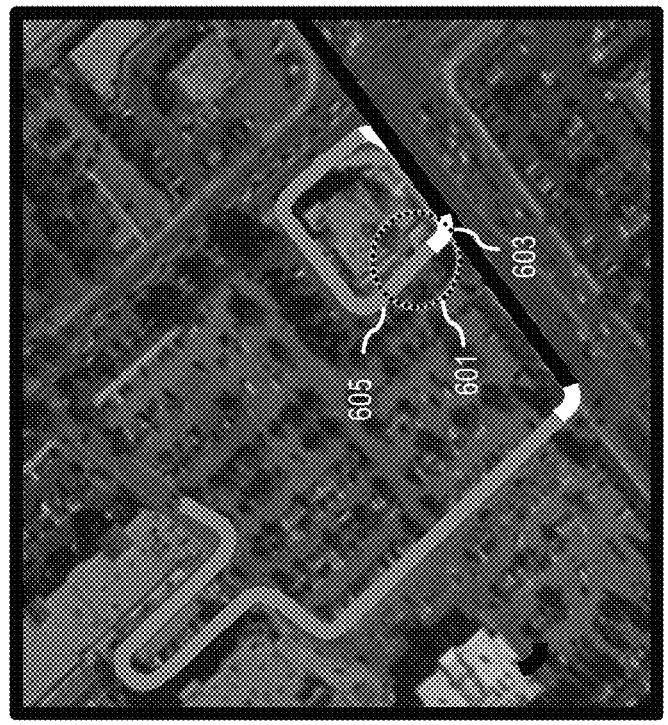
Figure 6C:
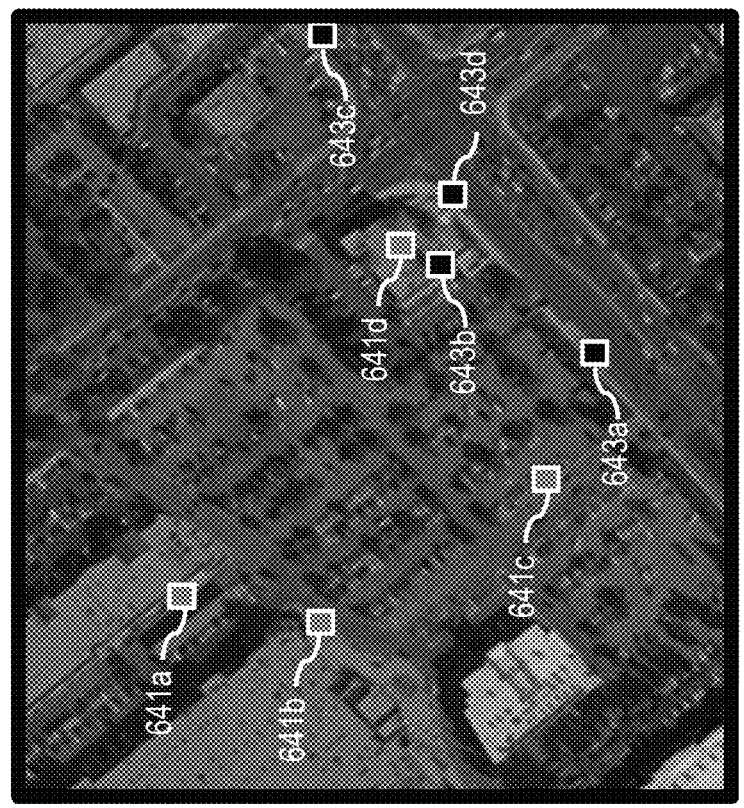

Similarly, in the example of FIGS. 6A-6C, the encircled part 601 of FIG. 6A shows that a white Unknown(0) segment 603 precedes a gray Bad(−1) segment 605. Therefore, when the same encircled part 601 is observed in FIG. 6B (depicting MEB diameter along the segment as described with respect to FIG. 5B), it is shown that the construction of the MEB starts from the white Unknown(0) segment 603 and continues into the gray Bad(−1) segment 605 (e.g., an off-road trajectory segment). This is again because in an intermediate merging step, the white Unknown(0) segment 603 and the gray Bad(−1) segment 605 have been merged into a single Bad(−1) segment because they co-occur.

Finally, when the centers of the MEBs corresponding to the sub-segments of the probe trajectory of the FIGS. 6A and 6B are determined, the centers can be designated as corresponding stay points that inherit the segment type from which they were derived. As shown in FIG. 6C, this enables the mapping platform 107 to distinguish between stay points 641a-641d that have formed off-road (e.g., originating from an off-road segment and indicated in gray in FIG. 6C) versus stay points 643a-643d that have formed on-road (e.g., originating from an on-road segment and indicated in black in FIG. 6C).

Figure 7:
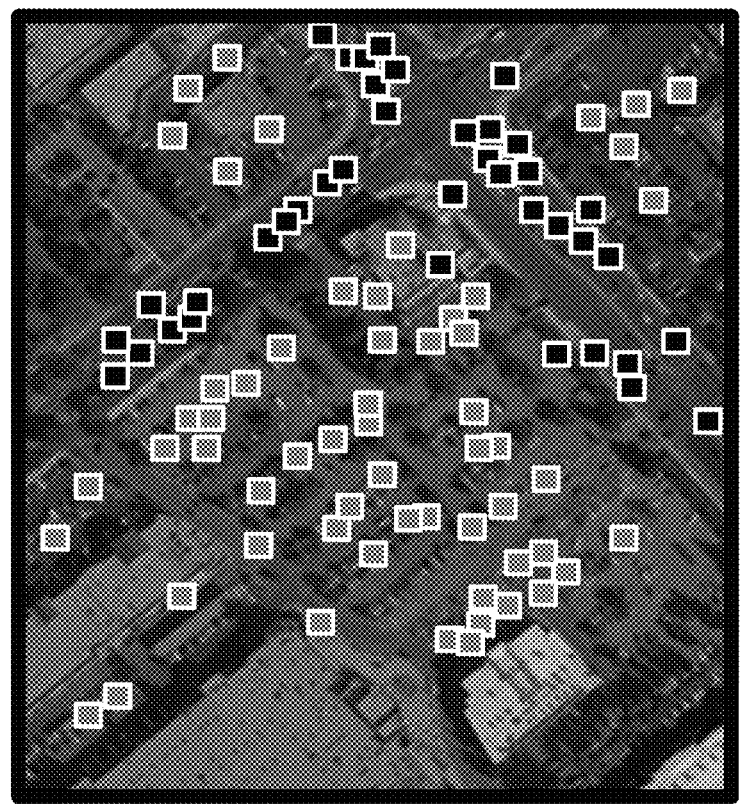
FIG. 7 is a diagram illustrating an example user interface for presenting on-road and off-road stay points, according to one embodiment.

In one embodiment, the output module 207 of the mapping platform 107 can store detected stay points and their identified types (e.g., on-road versus off-road) in a stay point data layer 111 of the geographic database 109 or equivalent database. This stay point data layer 111 can then be published for use by any variety of services 117, applications, and/or any other end user. As shown in the example of FIG. 7, off-road stay points (e.g., indicated in gray) and on-road stay points (e.g., indicated black) can be determined according to the embodiments described herein for a set of different individual probe trajectories and then presented in a user interface (e.g., mapping user interface 701) depicting a representation of the stay points of different types. The output module 207 can provide data for presenting the user interface 701 or equivalent. In one embodiment, the distinction between on-road and off-road stay points enables the mapping platform 107 to differentiate between someone stuck in traffic versus some parking a car at an off-street parking lot directly from probe trajectory data and corresponding digital map data.

Figure 8:
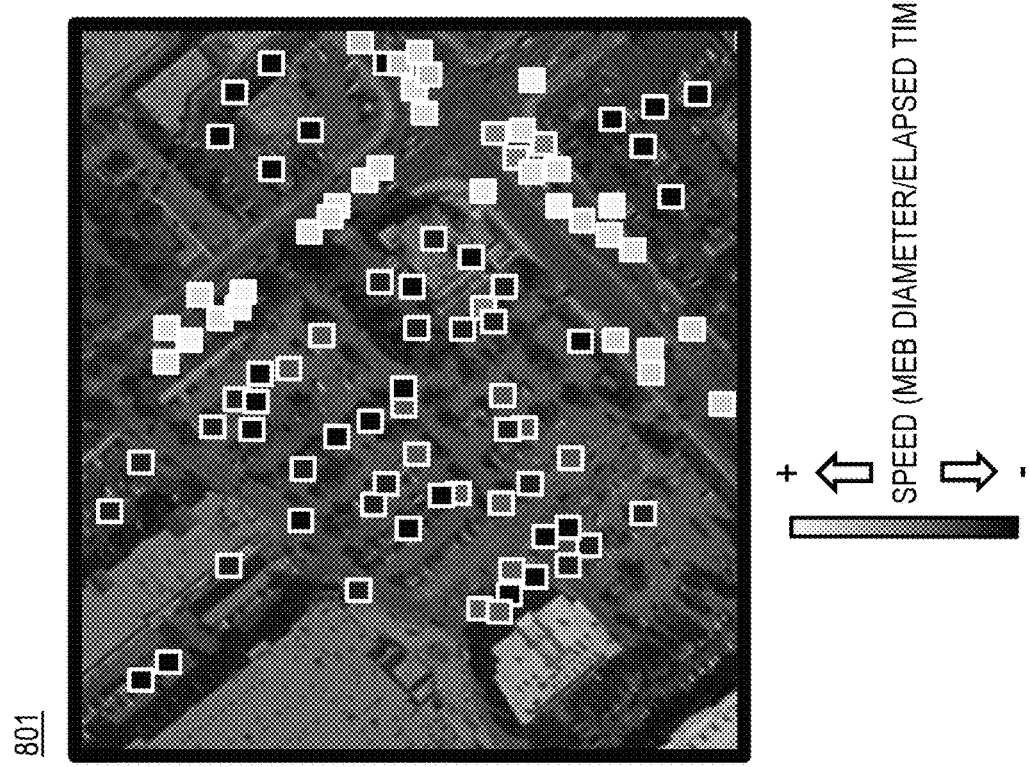
FIG. 8 is a diagram illustrating an example user interface for presenting attributes derived from detected off-road stay points, according to one embodiment.

In one embodiment, the mapping platform 107 and/or any other end user can derive other information from the detected and identified stay points. For example, as shown in FIG. 8, the mapping platform can calculate a distribution of speed values across or within different trajectory segment types (e.g., off-road segment versus on-road segments) by calculating the speed as a function of the MEB diameter enclosing a probe segment and elapsed time the probe device remained within the MEB (e.g., time difference between an earliest probe point and a latest probe point enclosed in the MEB) In one embodiment, the derived data can be stored in the stay point data layer 111 and/or presented in a user interface (e.g., a mapping user interface 801 of FIG. 8). As shown, mapping user interface 801 depicts stay points detected either off-road or on-road with their respective shades indicating their calculated speeds (e.g., darker shades indicating slower speeds and lighter shades indicating higher speeds). These speed values are calculated based on the corresponding MEB diameter and elapsed time the probe has stayed in the MEB.

In another embodiment, once the segments of the trajectory are defined as describe in the embodiments above, the mapping platform 107 could look at the variance of Good (1), Unknown(0), and Bad(−1) matches in a segment. Stay points created from segments where the map matching fluctuates rapidly or stay points that are in a continuous transition probability could be used to indicate parking availability (e.g., on-road parking) or other traffic information. In one embodiment, the mapping platform 107 can monitor the variance of detected stay points to determine their periodicity. In other words, the mapping platform 107 can monitor the period over which a stay point appears and then disappears. Such a periodicity for on-road stay points can be correlated to map data indicating co-located traffic lights to infer the periodicity of the traffic lights. This data on the periodicity of traffic lights can then be used, in turn, to improve estimates of time of arrival or to guide a user to a correct speed or directions to increase a probability of avoiding red lights.

In another example use case, the differentiation between on-road and off-road stays can be used to increase the privacy of shared trajectory data. For example, the mapping platform 107 can remove the portion of probe trajectory data or assign a different probe ID to those portions that correspond to off-road stays. This is because off-road stays, under some circumstances, can be used to identify personal information (e.g., a home address, shopping preferences, etc.) that can potentially comprise the identify or other personal information of a user contributing probe data. In another use case, a ride-sharing company, delivery company, public transport, etc. can evaluate differentiated stay points to identify potential pick up locations, drop off locations, delivery locations, etc.

As indicated above, the examples of map-matching to on-road versus off-road segments is only one example of how a probe trajectory can be segmented. It is contemplated that the map-matching can be to any type of map feature including proprietary maps or road network features specified by an end user. For example, if a user is studying traffic patterns through intersections, the map-matching can be used to segment probe trajectories based on which segments are matched to intersections to differentiate between "intersection" trajectory segments within proximity of a node of a digital map and "non-intersection" trajectories. Then intersection and non-intersection stay points can be identified and analyzed to determine traffic flow through the intersections.

In one embodiment, the process for identifying stay points from probe data described herein can be performed as an offline batch process or in substantially real-time. In an offline batch process, the mapping platform 107 can collect historical probe trajectories over a period of time and then process them to identify stay points. In a substantially real-time process, the mapping platform 107 can collect probe trajectory over a designated most recent time epoch (e.g., a most recent 15-minute time period), and then process the probe trajectories occurring within the most recent time epoch to identify and output stay points according to the embodiments described herein. The time period of the most recent time epoch can vary depending on the time granularity desired. For example, a shorter time-epoch can be more sensitive to quick fluctuations in stay points while longer time-epochs are less susceptible to data noise.

The use cases described above are provided by way of illustration and not as limitations. It is contemplated that the stay point data output the by mapping platform 107 according to the embodiments described above can be used for any application, service, etc.

Returning to FIG. 1, as shown, the system 100 includes the mapping platform 107 with connectivity or access over a communication network 113 to a geographic database 109 which stores digital map data against which probe trajectories can be map matched according to the embodiments described herein. In one embodiment, the mapping platform 107 also has connectivity over the communication network 113 to the services platform 115 that provides one or more services 117 (e.g., services that use or generate stay point data). By way of example, the services 117 may be third party services and include mapping services, navigation services, travel planning services, notification services, social networking services, content (e.g., audio, video, images, etc.) provisioning services, application services, storage services, contextual information determination services, location based services, information based services (e.g., weather, news, etc.), etc. In one embodiment, the services 117 uses the output of the mapping platform 107 (e.g., stay points and their identified types, derived attributes, etc.) for presentation of user interfaces using the vehicle 101 or UE 103 (e.g., a portable navigation device, smartphone, portable computer, tablet, etc.) related to services such as but not limited to navigation, mapping, other location-based services, etc.

In one embodiment, the mapping platform 107 may be a platform with multiple interconnected components. The mapping platform 107 may include multiple servers, intelligent networking devices, computing devices, components and corresponding software for providing parametric representations of lane lines. In addition, it is noted that the mapping platform 107 may be a separate entity of the system 100, a part of the one or more services 117, a part of the services platform 115, or included within the UE 103 and/or vehicle 101.

In one embodiment, content providers 119*a*-119*m* (collectively referred to as content providers 119) may provide content or data (e.g., including geographic data, parametric representations of mapped features, etc.) to the geographic database 109, the services platform 115, the services 117, the UE 103, the vehicle 101, and/or an application 121 executing on the UE 103. The content provided may be any type of content, such as map content, textual content, audio content, video content, image content, etc. In one embodiment, the content providers 119 may provide content that may aid in the detecting and classifying of lane lines and/or other features in image data and degerming feature correspondences. In one embodiment, the content providers 119 may also store content associated with the geographic database 109, mapping platform 107, services platform 115, services 117, UE 103, and/or vehicle 101. In another embodiment, the content providers 119 may manage access to a central repository of data, and offer a consistent, standard interface to data, such as a repository of the geographic database 109.

In one embodiment, the UE 103 and/or vehicle 101 may execute a software application 121 to capture probe trajectory data for identifying stay points according the embodiments described herein. By way of example, the application 121 may also be any type of application that is executable on the UE 103 and/or vehicle 101, such as autonomous driving applications, mapping applications, location-based service applications, navigation applications, content provisioning services, camera/imaging application, media player applications, social networking applications, calendar applications, and the like. In one embodiment, the application 121 may act as a client for the mapping platform 107 and perform one or more functions associated with identifying stay points from probe data alone or in combination with the mapping platform 107.

By way of example, the UE 103 is any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 103 can support any type of interface to the user (such as "wearable" circuitry, etc.). In one embodiment, the UE 103 may be associated with the vehicle 101 or be a component part of the vehicle 101.

In one embodiment, each vehicle 101 and/or UE 103 is assigned a unique probe identifier (probe ID) for use in reporting or transmitting probe data collected by the vehicle 101 and UE 103. The vehicle 101 and UE 103, for instance, are part of a probe-based system for collecting probe data for measuring traffic conditions in a road network. In one embodiment, each vehicle 101 and/or UE 103 is configured to report probe data as probe points, which are individual data records collected at a point in time that records telemetry data for that point in time. The probe points can be reported from the vehicle 101 and/or UEs 103 in real-time, in batches, continuously, or at any other frequency requested by the system 100 over, for instance, the communication network 113 for processing by the mapping platform 107.

In one embodiment, a probe point can include attributes such as: probe ID, longitude, latitude, heading, speed, and/or time. The list of attributes is provided by way of illustration and not limitation. Accordingly, it is contemplated that any combination of these attributes or other attributes may be recorded as a probe point (e.g., such as those previously discussed above). The probe points can be arranged by probe ID and time to construct probe trajectories for each probe ID. In one embodiment, the UE 103 and/or vehicle 101 are configured with various sensors for generating or collecting probe data (e.g., for processing by the mapping platform 107), related geographic data, etc. In one embodiment, the sensed data represent sensor data associated with a geographic location or coordinates at which the sensor data was collected. By way of example, the sensors may include a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture ground control point imagery, etc. for analysis), an audio recorder for gathering audio data, velocity sensors mounted on steering wheels of the vehicles, switch sensors for determining whether one or more vehicle switches are engaged, and the like.

Other examples of sensors of the UE 103 and/or vehicle 101 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the UE 103 and/or vehicle 101 may detect the relative distance of the vehicle from a lane or roadway, the presence of other vehicles, pedestrians, traffic lights, potholes and any other objects, or a combination thereof. In one scenario, the sensors may detect weather data, traffic information, or a combination thereof. In one embodiment, the UE 103 and/or vehicle 101 may include GPS or other satellite-based receivers to obtain geographic coordinates from satellites 123 for determining current location and time. Further, the location can be determined by visual odometry, triangulation systems such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, the communication network 113 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the mapping platform 107, services platform 115, services 117, UE 103, vehicle 101, and/or content providers 119 communicate with each other and other components of the system 100 using well known, new or still developing protocols. In this context, a protocol includes a set of rules defining how the network nodes within the communication network 113 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 9:
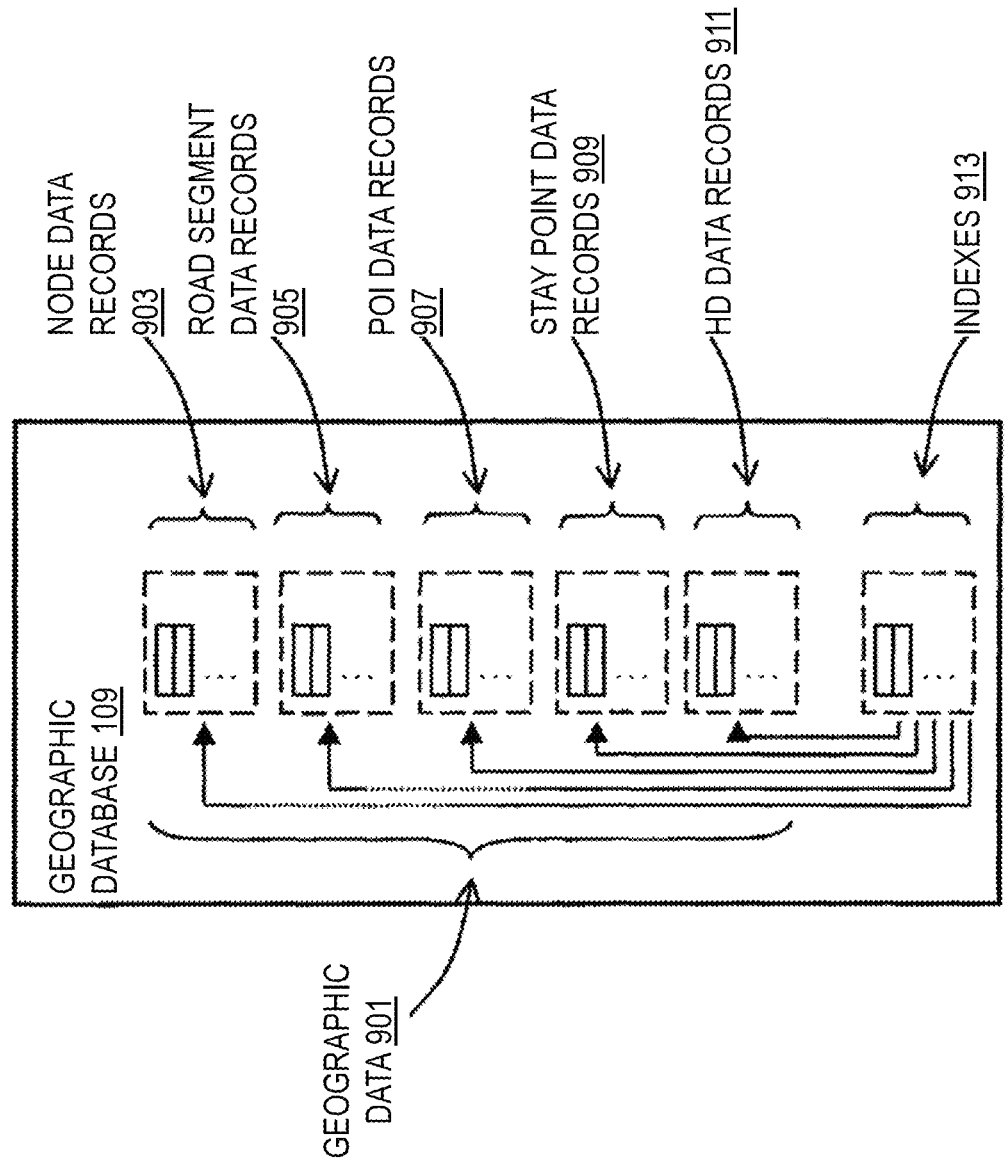
FIG. 9 is a diagram of a geographic database, according to one embodiment.

FIG. 9 is a diagram of a geographic database, according to one embodiment. In one embodiment, the geographic database 109 includes geographic data 901 used for (or configured to be compiled to be used for) mapping and/or navigation-related services, such as for video odometry based on the mapped features (e.g., lane lines, road markings, signs, etc.). In one embodiment, the geographic database 109 includes high resolution or high definition (HD) mapping data that provide centimeter-level or better accuracy of map features. For example, the geographic database 109 can be based on Light Detection and Ranging (LiDAR) or equivalent technology to collect billions of 3D points and model road surfaces and other map features down to the number lanes and their widths. In one embodiment, the HD mapping data (e.g., HD data records 911) capture and store details such as the slope and curvature of the road, lane markings, roadside objects such as sign posts, including what the signage denotes. By way of example, the HD mapping data enable highly automated vehicles to precisely localize themselves on the road.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 109.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 109 follows certain conventions. For example, links do not cross themselves and do not cross each other except at a node. Also, there are no duplicated shape points, nodes, or links. Two links that connect each other have a common node. In the geographic database 109, overlapping geographic features are represented by overlapping polygons. When polygons overlap, the boundary of one polygon crosses the boundary of the other polygon. In the geographic database 109, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 109 includes node data records 903, road segment or link data records 905, POI data records 907, stay point data records 909, HD mapping data records 911, and indexes 913, for example. More, fewer or different data records can be provided. In one embodiment, additional data records (not shown) can include cartographic ("carto") data records, routing data, and maneuver data. In one embodiment, the indexes 913 may improve the speed of data retrieval operations in the geographic database 109. In one embodiment, the indexes 913 may be used to quickly locate data without having to search every row in the geographic database 109 every time it is accessed. For example, in one embodiment, the indexes 913 can be a spatial index of the polygon points associated with stored feature polygons.

In exemplary embodiments, the road segment data records 905 are links or segments representing roads, streets, or paths, as can be used in the calculated route or recorded route information for determination of one or more personalized routes. The node data records 903 are end points corresponding to the respective links or segments of the road segment data records 905. The road link data records 905 and the node data records 903 represent a road network, such as used by vehicles, cars, and/or other entities. Alternatively, the geographic database 109 can contain path segment and node data records or other data that represent pedestrian paths or areas in addition to or instead of the vehicle road record data, for example.

The road/link segments and nodes can be associated with attributes, such as functional class, a road elevation, a speed category, a presence or absence of road features, geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 109 can include data about the POIs and their respective locations in the POI data records 907. The geographic database 109 can also include data about places, such as cities, towns, or other communities, and other geographic features, such as bodies of water, mountain ranges, etc. Such place or feature data can be part of the POI data records 907 or can be associated with POIs or POI data records 907 (such as a data point used for displaying or representing a position of a city).

In one embodiment, the geographic database 109 can also include stay point data records 909 for storing the identified stay points, trajectory segments, and/or MEBs, as well as other related data used or generated according to the various embodiments described herein. In one embodiment, the stay point data records 909 can be published as the stay point data layer 111 to provide differentiate stay points to end users. By way of example, the stay point data records 909 can be associated with one or more of the node records 903, road segment records 905, and/or POI data records 907. In this way, the stay point data records 909 can also be associated with or used to classify the characteristics or metadata of the corresponding records 903, 905, and/or 907.

In one embodiment, as discussed above, the HD mapping data records 911 model road surfaces and other map features to centimeter-level or better accuracy. The HD mapping data records 911 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the HD mapping data records 911 are divided into spatial partitions of varying sizes to provide HD mapping data to vehicles 101 and other end user devices with near real-time speed without overloading the available resources of the vehicles 101 and/or devices (e.g., computational, memory, bandwidth, etc. resources).

In one embodiment, the HD mapping data records 911 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 911.

In one embodiment, the HD mapping data records 911 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, the geographic database 109 can be maintained by the content provider 119 in association with the services platform 115 (e.g., a map developer). The map developer can collect geographic data to generate and enhance the geographic database 109. There can be different ways used by the map developer to collect data. These ways can include obtaining data from other sources, such as municipalities or respective geographic authorities. In addition, the map developer can employ field personnel to travel by vehicle (e.g., vehicle 101 and/or UE 103) along roads throughout the geographic region to observe features and/or record information about them, for example. Also, remote sensing, such as aerial or satellite photography, can be used.

The geographic database 109 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 101 or UE 103, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for identifying stay points from probe data may be advantageously implemented via software, hardware, firmware or a combination of software and/or firmware and/or hardware. For example, the processes described herein, including for providing user interface navigation information associated with the availability of services, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 10:
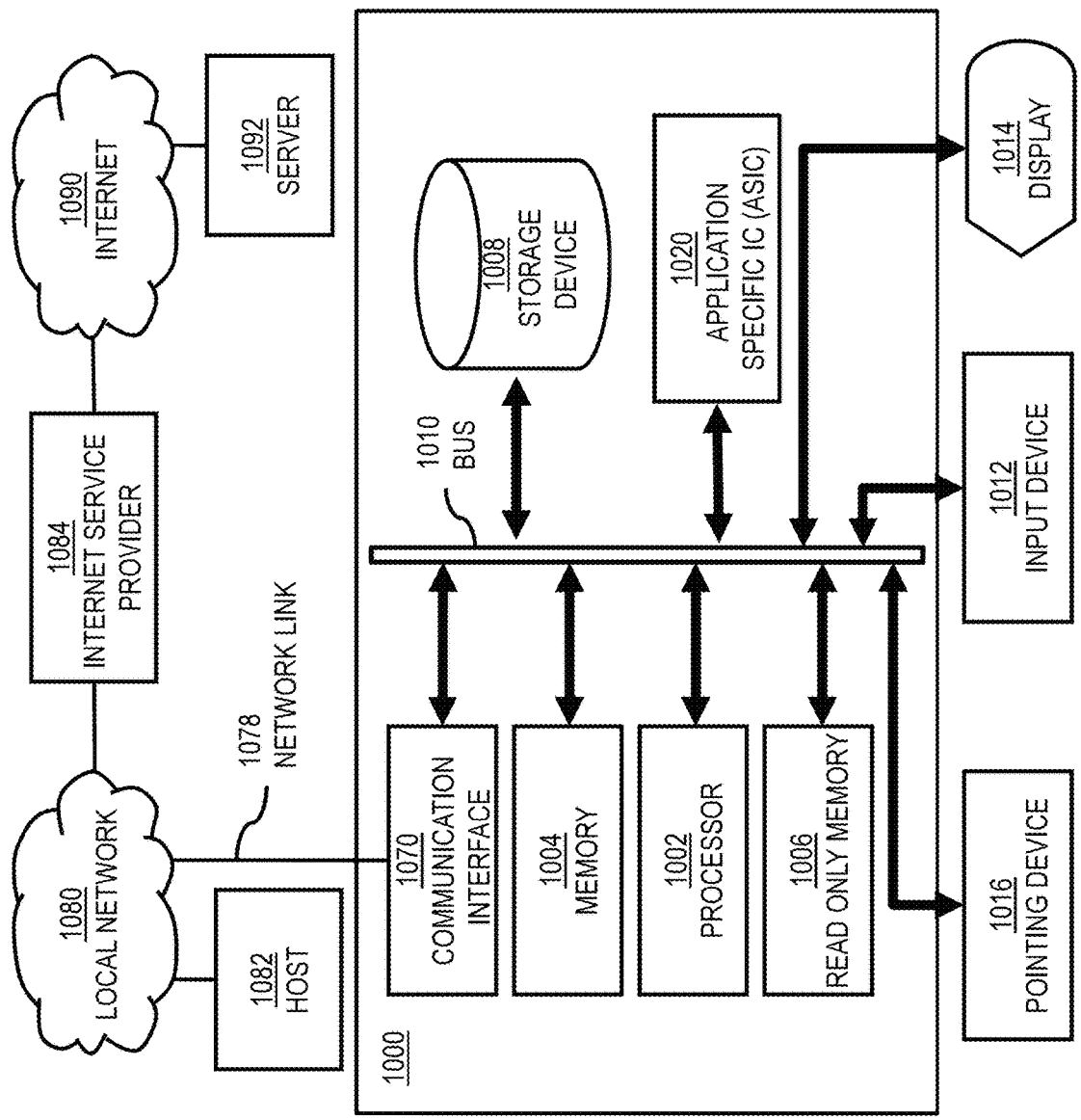
FIG. 10 is a diagram of hardware that can be used to implement an embodiment.

FIG. 10 illustrates a computer system 1000 upon which an embodiment of the invention may be implemented. Although computer system 1000 is depicted with respect to a particular device or equipment, it is contemplated that other devices or equipment (e.g., network elements, servers, etc.) within FIG. 10 can deploy the illustrated hardware and components of system 1000. Computer system 1000 is programmed (e.g., via computer program code or instructions) to identify stay points from probe data as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1000, or a portion thereof, constitutes a means for performing one or more steps of identifying stay points from probe data.

A bus 1010 includes one or more parallel conductors of information so that information is transferred quickly among devices coupled to the bus 1010. One or more processors 1002 for processing information are coupled with the bus 1010.

A processor (or multiple processors) 1002 performs a set of operations on information as specified by computer program code related to identifying stay points from probe data. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RAM) or other dynamic storage device, stores information including processor instructions for identifying stay points from probe data. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for identifying stay points from probe data, is provided to the bus 1010 for use by the processor from an external input device 1012, such as a keyboard containing alphanumeric keys operated by a human user, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT) or a liquid crystal display (LCD), or plasma screen or printer for presenting text or images, and a pointing device 1016, such as a mouse or a trackball or cursor direction keys, or motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of application specific ICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 113 for identifying stay points from probe data.

The term "computer-readable medium" as used herein refers to any medium that participates in providing information to processor 1002, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1008. Volatile media include, for example, dynamic memory 1004. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1020.

Network link 1078 typically provides information communication using transmission media through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090.

A computer called a server host 1092 connected to the Internet hosts a process that provides a service in response to information received over the Internet. For example, server host 1092 hosts a process that provides information representing video data for presentation at display 1014. It is contemplated that the components of system 1000 can be deployed in various configurations within other computer systems, e.g., host 1082 and server 1092.

At least some embodiments of the invention are related to the use of computer system 1000 for implementing some or all of the techniques described herein. According to one embodiment of the invention, those techniques are performed by computer system 1000 in response to processor 1002 executing one or more sequences of one or more processor instructions contained in memory 1004. Such instructions, also called computer instructions, software and program code, may be read into memory 1004 from another computer-readable medium such as storage device 1008 or network link 1078. Execution of the sequences of instructions contained in memory 1004 causes processor 1002 to perform one or more of the method steps described herein. In alternative embodiments, hardware, such as ASIC 1020, may be used in place of or in combination with software to implement the invention. Thus, embodiments of the invention are not limited to any specific combination of hardware and software, unless otherwise explicitly stated herein.

The signals transmitted over network link 1078 and other networks through communications interface 1070, carry information to and from computer system 1000. Computer system 1000 can send and receive information, including program code, through the networks 1080, 1090 among others, through network link 1078 and communications interface 1070. In an example using the Internet 1090, a server host 1092 transmits program code for a particular application, requested by a message sent from computer 1000, through Internet 1090, ISP equipment 1084, local network 1080 and communications interface 1070. The received code may be executed by processor 1002 as it is received, or may be stored in memory 1004 or in storage device 1008 or other non-volatile storage for later execution, or both. In this manner, computer system 1000 may obtain application program code in the form of signals on a carrier wave.

Various forms of computer readable media may be involved in carrying one or more sequence of instructions or data or both to processor 1002 for execution. For example, instructions and data may initially be carried on a magnetic disk of a remote computer such as host 1082. The remote computer loads the instructions and data into its dynamic memory and sends the instructions and data over a telephone line using a modem. A modem local to the computer system 1000 receives the instructions and data on a telephone line and uses an infra-red transmitter to convert the instructions and data to a signal on an infra-red carrier wave serving as the network link 1078. An infrared detector serving as communications interface 1070 receives the instructions and data carried in the infrared signal and places information representing the instructions and data onto bus 1010. Bus 1010 carries the information to memory 1004 from which processor 1002 retrieves and executes the instructions using some of the data sent with the instructions. The instructions and data received in memory 1004 may optionally be stored on storage device 1008, either before or after execution by the processor 1002.

FIG. 11 illustrates a chip set or chip 1100 upon which an embodiment of the invention may be implemented. Chip set 1100 is programmed to identify stay points from probe data as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1100 can be implemented in a single chip. It is further contemplated that in certain embodiments the chip set or chip 1100 can be implemented as a single "system on a chip." It is further contemplated that in certain embodiments a separate ASIC would not be used, for example, and that all relevant functions as disclosed herein would be performed by a processor or processors. Chip set or chip 1100, or a portion thereof, constitutes a means for performing one or more steps of providing user interface navigation information associated with the availability of services. Chip set or chip 1100, or a portion thereof, constitutes a means for performing one or more steps of identifying stay points from probe data.

In one embodiment, the chip set or chip 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1100 includes merely one or more processors and some software and/or firmware supporting and/or relating to and/or for the one or more processors.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to identify stay points from probe data. The memory 1105 also stores the data associated with or generated by the execution of the inventive steps.

Figure 12:
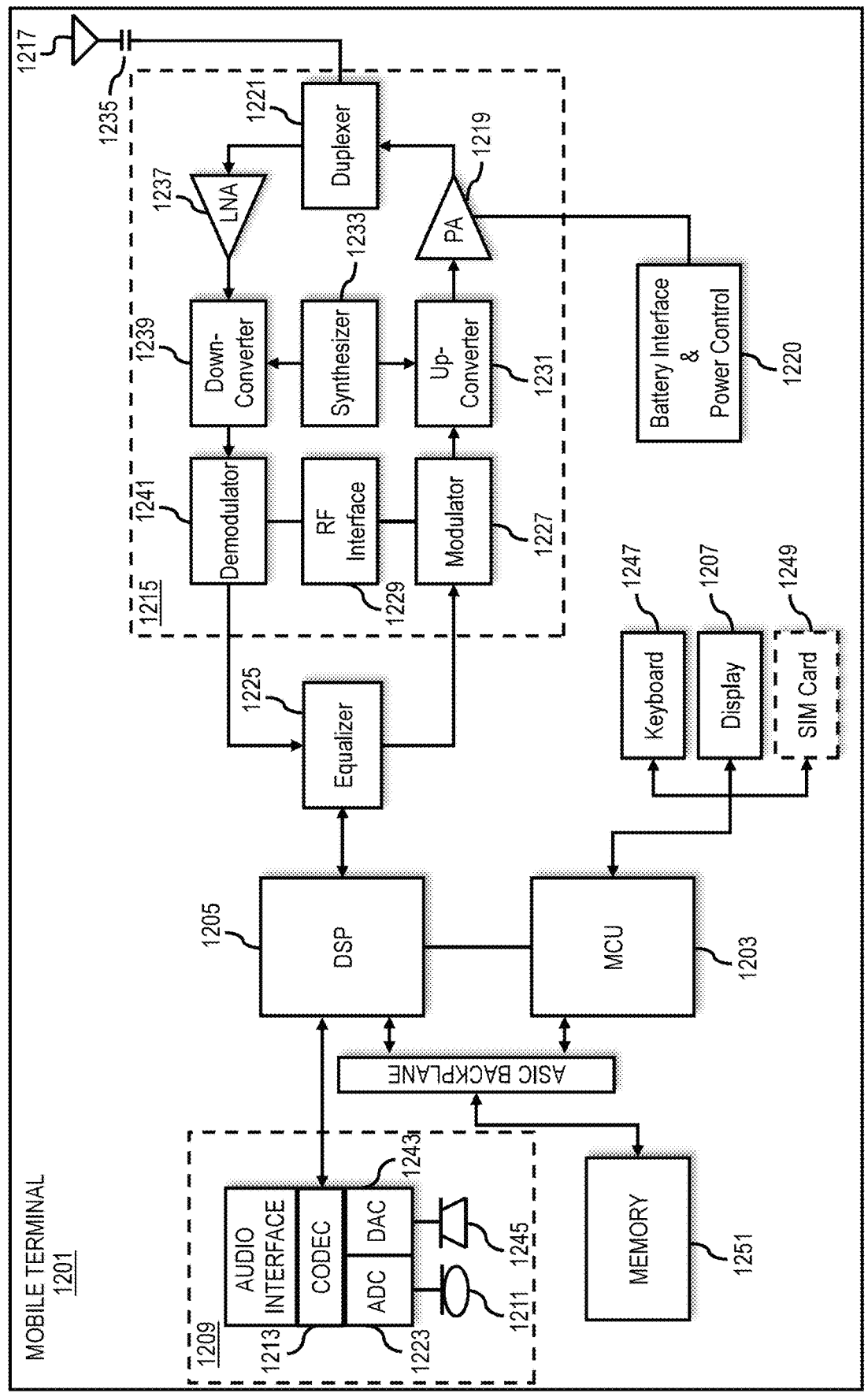
FIG. 12 is a diagram of a mobile terminal (e.g., handset, vehicle, or component thereof) that can be used to implement an embodiment.

FIG. 12 is a diagram of exemplary components of a mobile terminal 1201 (e.g., handset such as the UE 103, vehicle 101, or component thereof) for communications, which is capable of operating in the system of FIG. 1, according to one embodiment. In some embodiments, the mobile terminal 1201, or a portion thereof, constitutes a means for performing one or more steps of identifying stay points from probe data. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile terminal functions that perform or support the steps of identifying stay points from probe data. The display 1207 includes display circuitry configured to display at least a portion of a user interface of the mobile terminal (e.g., mobile telephone). Additionally, the display 1207 and display circuitry are configured to facilitate user control of at least some functions of the mobile terminal. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile terminal 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203—which can be implemented as a Central Processing Unit (CPU) (not shown).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile terminal 1201 to identify stay points from probe data. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the terminal. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile terminal 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable storage medium known in the art. The memory device 1251 may be, but not limited to, a single memory, CD, DVD, ROM, RAM, EEPROM, optical storage, or any other non-volatile storage medium capable of storing digital data.

An optionally incorporated SIM card 1249 carries, for instance, important information, such as the cellular phone number, the carrier supplying service, subscription details, and security information. The SIM card 1249 serves primarily to identify the mobile terminal 1201 on a radio network. The card 1249 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for detecting stay points from probe data comprising:
    segmenting a probe trajectory into a first trajectory segment of a first type, a second trajectory segment of a second type, an unknown trajectory segment of an unknown type, or a combination thereof, wherein the probe trajectory is collected using a plurality of sensors;
    merging the unknown trajectory segment into either the first trajectory segment or the second trajectory segment based on a co-occurrence of the unknown trajectory segment with either the first trajectory segment or the second trajectory segment;
    segmenting the first trajectory segment into a plurality of first sub-segments, the second trajectory segment, or a combination thereof into a plurality of second sub-segments based on a minimum enclosing ball with a radius less than or equal to a distance threshold; and
    processing the first sub-segments or the second sub-segments to determine respectively a first stay point of the first type or a second stay point of the second type, wherein the first trajectory segment of the first type is an on-road trajectory segment, the second trajectory segment of the second type is an off-road trajectory segment, the first stay point of the first type is an on-road stay point, and the second stay point of the second type is an off-road stay point.

2. The method of claim 1, wherein the segmenting of the probe trajectory is based on a map-matching confidence of the probe trajectory to a digital map storing map features of the first type, the second type, or a combination thereof.

3. The method of claim 2, further comprising:
    classifying a segment of the probe trajectory into the first trajectory segment of the first type based on determining that the map matching confidence is greater than an upper threshold value, or into the second trajectory segment of the second type based on determining that the map matching confidence is less than a lower threshold value.

4. The method of claim 1, wherein the segmenting of the probe trajectory is based on an attribute of a probe from which the probe trajectory was collected, and wherein the attribute includes a speed, a heading, or a combination thereof of the probe.

5. The method of claim 1, further comprising:
    determining a variance in the first stay point, the second stay point, or a combination thereof over time.

6. The method of claim 5, further comprising:
    determining parking information, traffic information, or a combination thereof based on the variance.

7. The method of claim 1, further comprising:
    providing data for presenting a user interface depicting a representation of the first stay point, the second stay point, or a combination thereof.

8. The method of claim 1, wherein the co-occurrence is based on determining that the unknown trajectory segment immediately precedes or follows either of the first trajectory segment or the second trajectory segment.

9. The method of claim 1, wherein the first type is a first road segment functional class, and wherein the second type is a second road segment functional class.

10. An apparatus for detecting stay points from probe data comprising:
    at least one processor; and
    at least one memory including computer program code for one or more programs, the at least one memory and the computer program code configured to, with the at least one processor, cause the apparatus to perform at least the following, segment a probe trajectory into a first trajectory segment of a first type, a second trajectory segment of a second type, or a combination thereof, wherein the probe trajectory is collected using a plurality of sensors;

segment the first trajectory segment into a plurality of first sub-segments, the second trajectory segment into a plurality of second sub-segments, or a combination thereof based on a bounding volume with a radius less than or equal to a distance threshold; and process the first sub-segments or the second sub-segments to determine respectively a first stay point of the first type or a second road stay point of the second type, wherein the first trajectory segment of the first type is an on-road trajectory segment, the second trajectory segment of the second type is an off-road trajectory segment, the first stay point of the first type is an on-road stay point, and the second stay point of the second type is an off-road stay point.

11. The apparatus of claim 10, wherein the apparatus is further caused to:

segment the probe trajectory further into an unknown probe trajectory in addition to the first trajectory segment, the second trajectory segment, or a combination thereof; and merge the unknown trajectory segment into either the first trajectory segment or the second trajectory segment based on a co-occurrence of the unknown trajectory segment with either the first trajectory segment or the second trajectory segment.

12. The apparatus of claim 10, wherein the segmenting of the probe trajectory is based on a map-matching confidence of the probe trajectory to a digital map storing map features of the first type, the second type, or a combination thereof.

13. The apparatus of claim 12, wherein the apparatus is further caused to:

classify a segment of the probe trajectory into the first trajectory segment of the first type based on determining that the map matching confidence is greater than an upper threshold value, and into the second trajectory segment of the second type based on determining that the map matching confidence is less than a lower threshold value.

14. A non-transitory computer-readable storage medium for detecting stay points from probe data, carrying one or more sequences of one or more instructions which, when executed by one or more processors, cause an apparatus to perform:

segmenting a probe trajectory into an on-road trajectory segment, an off-road trajectory segment, or a combination thereof based on a map matching confidence, wherein the probe trajectory is collected using a plurality of sensors;

segmenting the on-road trajectory segment into a plurality of on-road sub-segments, the off-road trajectory segment into a plurality of off-road sub-segments, or a combination thereof based on a minimum enclosing ball with a radius less than or equal to a distance threshold; and processing the on-road sub-segments or the off-road sub-segments to determine respectively an on-road stay point or an off-road stay point.

15. The non-transitory computer-readable storage medium of claim 14, wherein the apparatus is caused to further perform:

segmenting the probe trajectory further into an unknown probe trajectory in addition to the first on-road trajectory segment, the off-road trajectory segment, or a combination thereof; and merging the unknown trajectory segment into either the on-road trajectory segment or the off-road trajectory segment based on a co-occurrence of the unknown trajectory segment with either the on-road trajectory segment or the off-road trajectory segment.

16. The non-transitory computer-readable storage medium of claim 14, wherein the apparatus is caused to further perform:

classifying a segment of the probe trajectory into the on-road trajectory segment based on determining that the map matching confidence is greater than an upper threshold value, or into the off-road trajectory segment based on determining that the map matching confidence is less than a lower threshold value.

17. The non-transitory computer-readable storage medium of claim 14, wherein the segmenting of the probe trajectory is based on an attribute of a probe from which the probe trajectory was collected, and wherein the attribute includes a speed, a heading, or a combination thereof of the probe.

18. The non-transitory computer-readable storage medium of claim 14, wherein the apparatus is caused to further perform:

determining a variance in the on-road stay point, the off-road stay point, or a combination thereof over time.

* * * * *